US009587931B2

(12) United States Patent
Son et al.

(10) Patent No.: US 9,587,931 B2
(45) Date of Patent: Mar. 7, 2017

(54) POSITION COMPENSATION DEVICE USING VISIBLE LIGHT COMMUNICATION AND METHOD THEREOF

(71) Applicant: Samsung Electronics Co., Ltd., Suwon-si, Gyeonggi-do (KR)

(72) Inventors: Jae-Seung Son, Suwon-si (KR); Tae-Han Bae, Seoul (KR); Sun-Gi Gu, Yongin-si (KR); Seung-Hoon Park, Seoul (KR); Eun-Tae Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 14/353,611

(22) PCT Filed: Nov. 7, 2012

(86) PCT No.: PCT/KR2012/009339
§ 371 (c)(1),
(2) Date: Apr. 23, 2014

(87) PCT Pub. No.: WO2013/069963
PCT Pub. Date: May 16, 2013

(65) Prior Publication Data
US 2014/0285819 A1 Sep. 25, 2014

(30) Foreign Application Priority Data

Nov. 7, 2011 (KR) ........................ 10-2011-0115208

(51) Int. Cl.
*G06M 7/00* (2006.01)
*G01B 11/14* (2006.01)
(Continued)

(52) U.S. Cl.
CPC .............. *G01B 11/14* (2013.01); *G01C 21/00* (2013.01); *G01C 21/206* (2013.01); *G01S 5/16* (2013.01)

(58) Field of Classification Search
CPC ....... G01C 21/206; G01S 1/70; H04B 10/114; H04B 10/116; H04B 10/1149
See application file for complete search history.

(56) References Cited

U.S. PATENT DOCUMENTS

2002/0089722 A1 7/2002 Perkins et al.
2005/0237347 A1* 10/2005 Yamaji ..................... G01D 5/14
347/5

(Continued)

FOREIGN PATENT DOCUMENTS

JP 09-119843 A 5/1997
JP 09-292248 A 11/1997
(Continued)

OTHER PUBLICATIONS

Chinnapat Sertthin, et al., XP031436691 "A Switching Estimated Receiver Position Scheme for Visible Light Based Indoor Positioning System", Feb. 11, 2009.

*Primary Examiner* — Thanh Luu
(74) *Attorney, Agent, or Firm* — Jefferson IP Law, LLP

(57) ABSTRACT

The present invention relates to a position compensation device using visible light communication and a method thereof. To this end, the present invention receives a visible light signal which includes lighting position information from a lighting device to extract the lighting position information from the received visible light signal, and calculates a compensated position of a position compensation device by using the extracted lighting position information if a request for position compensation exists, thereby providing an exact position of a user indoors.

10 Claims, 3 Drawing Sheets

(51) Int. Cl.
*G01C 21/20* (2006.01)
*G01S 5/16* (2006.01)
*G01C 21/00* (2006.01)

(56) References Cited

U.S. PATENT DOCUMENTS

2009/0167542 A1* 7/2009 Culbert ............. H04M 1/72569
340/635
2010/0322635 A1* 12/2010 Klinghult ............... H04B 10/11
398/132
2011/0153201 A1* 6/2011 Park ....................... G01C 21/20
701/533

FOREIGN PATENT DOCUMENTS

| JP | 2009-060181 A | 3/2009 |
| JP | 2009-288173 A | 12/2009 |
| KR | 10-2001-0011922 A | 2/2001 |
| KR | 10-2006-0034883 A | 4/2006 |

* cited by examiner

POSITION COMPENSATION DEVICE USING VISIBLE LIGHT COMMUNICATION AND METHOD THEREOF

TECHNICAL FIELD

The present invention relates to an apparatus and a method of correcting a position, and more particularly, to an apparatus and a method of correcting a position by providing an accurate position of a terminal by using visible light communication.

BACKGROUND ART

In general, a transmitter outputs visible light by using a Light Emitting Diode (LED), a Laser Diode (LD), or the like as a light source, and a receiver processes the output visible light by using a Photo Detector (PD) and the like to perform visible light communication.

Interest in visible light communication has grown in recent times due to depletion of frequencies in the Radio Frequency (RF) band, visible light communication's crosstalk possibility between various wireless communication technologies, an increase in demand of communication security, and the like. Further, together with a rapid spread of LED lighting, the use of visible light communication has also rapidly increased.

The visible light communication is safe, and has a wide use band and is not regulated and to be freely used, and further, it is possible to recognize a place which light reaches or a direction in which light moves, so that there is an advantage in that it is possible to accurately recognize a reception range of information. Accordingly, visible light communication is reliable in terms of security. Further, visible light communication is advantageous due to its lower power consumption levels.

Accordingly, visible light communication is applicable to hospitals, airplanes, and the like in which the use of the RF is limited, and may provide additional information services using an electronic display board.

In the meantime, a portable mobile terminal includes additional functions, such as a message transceiving function, a wireless Internet function, and a positioning service function, in addition to a simple voice communication function for convenience of the user.

DETAILED DESCRIPTION OF THE INVENTION

Technical Problem

As described above, a positioning service in the related art measures a position of a mobile terminal or a user, or provide information about a position by using a medium, such as radio waves and light. A navigation system using a GPS signal is one of implementation example of such a positioning service. The navigation system may be used outdoors, but has a disadvantage in that the navigation system is not usable due to the inability to receive GPS signals indoors or in a basement. Considering real situations where various services using positioning are developed, it is necessary to develop a positioning technology and system usable indoors.

Technical Solution

Accordingly, the present invention provides an apparatus and a method of performing position correction by using visible light communication in order to accurately provide a position of a terminal even at an indoor site.

In order to achieve the aforementioned object, an apparatus for correcting a position by using visible light communication includes: a transceiver that receives a visible light signal including lighting device position information from a lighting device; a position correction unit that calculates a corrected position of the apparatus for correcting the position by using the received visible light signal; and a controller that extracts the lighting device position information from the visible light signal when the visible light signal is received from the transceiver, and control the position correction unit so as to calculate a corrected position of the apparatus for correcting the position according to a request for position correction.

Further, a method of correcting a position by using visible light communication in a position correction apparatus includes: receiving a visible light signal including lighting device position information from a lighting device; extracting the lighting device position information from the received visible light signal; and calculating a corrected position of the apparatus for correcting the position by using the extracted lighting position information when a request for position correction is present.

Advantageous Effects

The present invention may advantageously provide an accurate position of a user according to a position information request of the user by using a visible light signal received from a lighting device.

MODE FOR CARRYING OUT THE INVENTION

Hereinafter, an exemplary embodiment according to the present invention will be described with reference to the accompanying drawings in detail. The detailed description of a known function and configuration, which may make the purpose of the present invention unnecessarily ambiguous will be omitted in the description below and the accompanying drawings.

An exemplary embodiment of the present invention provides an apparatus and a method of correcting a position by using visible light communication. In the providing of position information about a terminal by using visible light communication, position information about a lighting device is provided as the position information about the terminal, so that even in a case where an actual position of the terminal is different from a position of the lighting, there incurs a case in which the position information received from the lighting is recognized as the position information about the terminal. Accordingly, in order to provide actual position information about the terminal, the present invention calculates an error distance between a position of a lighting device and an actual position of a terminal, and calculates a corrected position of the terminal based on the calculated error distance, thereby providing a user with an accurate position of the terminal.

Figure 1:
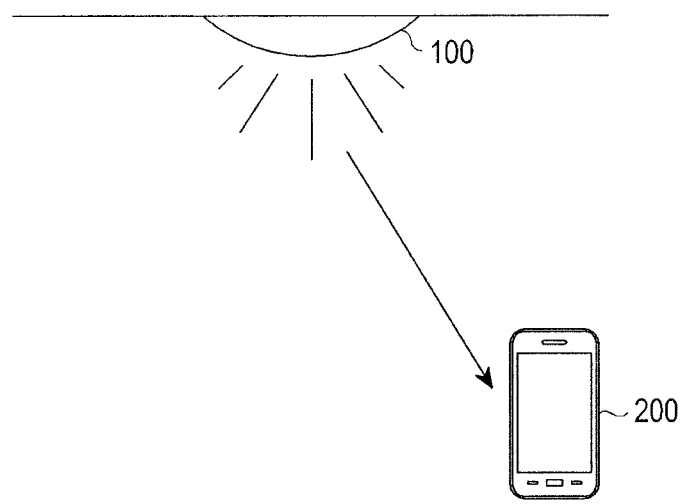
FIG. 1 is a configuration diagram illustrating a lighting device and a terminal according to an exemplary embodiment of the present invention.

FIG. 1 is a configuration diagram illustrating a lighting device and a terminal according to an exemplary embodiment of the present invention.

A lighting device 100 outputs a visible light signal including lighting position information including a predetermined lighting position identifier. Here, the lighting position identifier includes data on a position in which the lighting device is positioned, such as address information and building information where the lighting device 100 is located.

When a terminal 200 receives a request to provide position information about the terminal 200, the terminal 200 determines whether a visible light signal including lighting device position information is received from the lighting device 100, and when the visible light signal is received, the terminal 200 extracts the lighting device position information from the visible light signal.

Then, when the terminal 200 is moving at a predetermined speed or more, the terminal 200 displays the extracted lighting device position information as position information about the terminal 200. In this case, the terminal 200 further includes an acceleration measurement sensor, and measures a movement speed of the terminal through the acceleration measurement sensor.

When the movement speed of the terminal 200 is smaller than the threshold speed, the terminal 200 determines whether a position correction request is received, and when the position corresponding request is received, the terminal 200 calculates an incident angle and an incident distance of the received visible light signal. Here, the incident angle means an angle formed between a horizontal direction in which the terminal 200 is positioned and a direction in which the visible light signal is incident, and the incident distant means a distance between the lighting device 100 and the terminal 200 in the direction in which the visible light signal is incident.

The terminal 200 calculates an error distance of the terminal 200 by using the calculated incident angle and incident distant, and calculates a corrected position of the terminal 200 by using the calculated error distance and the lighting device position information.

Then, the terminal 200 displays the calculated corrected position on a screen of the terminal 200. For example, the terminal 200 may display an icon indicating the calculated corrected position on a map information screen image.

As described above, the present invention may accurately provide a position of a terminal at an indoor site by using visible light communication through a lighting device.

Figure 2:
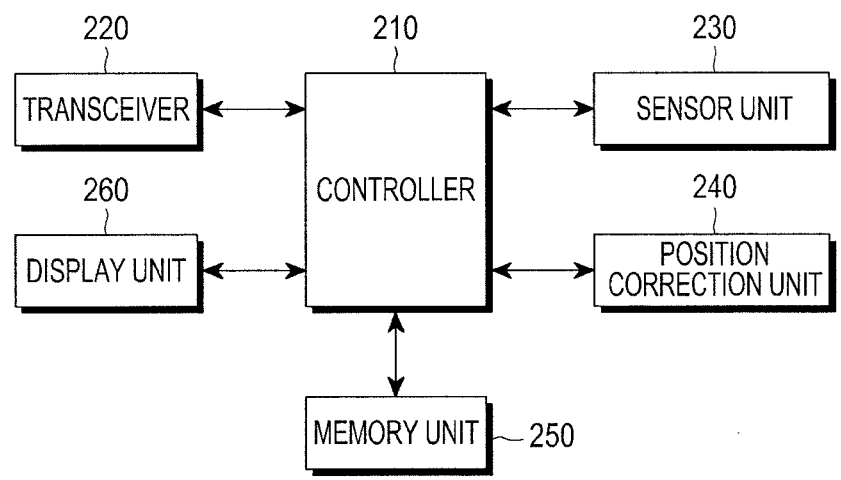
FIG. 2 is a configuration diagram of a terminal for correcting a position using visible light communication according to an exemplary embodiment of the present invention.

FIG. 2 is a configuration diagram of the terminal 200 for correcting a position using visible light communication according to an exemplary embodiment of the present invention.

The terminal 200 of the present invention includes a controller 210, a transceiver 220, a sensor unit 230, a position correction unit 240, a memory unit 250, and a display unit 260.

The controller 210 controls a general operation of the terminal 200, and particularly, when the controller 210 receives a request to provide the position information about the terminal 200, the controller 210 determines whether a visible light signal including the lighting position information is received through the transceiver 220, and when the visible light signal is received, the controller 210 extracts lighting device position information from the received visible light signal. Here, the lighting device position information includes a lighting device position identifier of the lighting device 100, and the lighting device position identifier includes data on a position at which the light device is positioned, such as address information and building information about the lighting device 100.

The controller 210 measures whether a movement speed of the terminal 200 is equal to or greater than a predetermined threshold speed through the sensor unit 230, and when the measured movement speed is equal to or greater than the threshold speed, the controller 210 displays the extracted lighting device position information through the display unit 260 as the position information about the terminal 200.

When the measured movement speed is smaller than the threshold speed, the controller 210 determines whether a request to correct the position is received.

When the request to correct the position is present as a result of the determination, the controller 210 calculates an error distance between the position of the lighting device and an actual position of the terminal 200 through the position correction unit 240, and calculates a corrected position of the terminal 200 by using the calculated error distance.

The controller 210 displays the calculated corrected position on the screen through the display unit 260.

The transceiver 220 receives a visible light signal broadcasted from the lighting device 100.

The sensor unit 230 includes a geomagnetic sensor for measuring a direction of the terminal 200, an acceleration sensor for measuring gravity acceleration of the terminal 200, and a gyro sensor capable of measuring inclinations of three axes (x-axis, y-axis, and z-axis) of the terminal 200.

The position correction unit 240 calculates an incident angle and an incident distance at and in which the visible light signal is incident through a camera (not shown) of the terminal 200 under control of the controller 210, calculates the error distance between the lighting device 100 and the terminal 200 by using the calculated incident angle and incident distance, and then calculates a corrected distance of the terminal 200 by using the calculated error distance. This will be described in detail with reference to FIG. 3.

Figure 3:
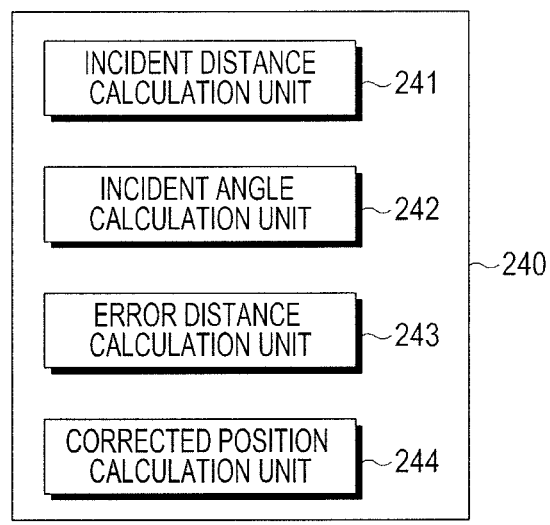
FIG. 3 is a detailed configuration diagram of a position correction unit according to the embodiment of the present invention.

FIG. 3 is a detailed configuration diagram of the position correction unit 240 according to the exemplary embodiment of the present invention.

The position correction unit 240 of the present invention includes an incident distance calculation unit 241, an incident angle calculation unit 242, an error distance calculation unit 243, and a corrected position calculation unit 244.

The incident distance calculation unit 241 calculates an incident distance between the lighting device 100 and the terminal 200 corresponding to the direction in which the visible light signal transmitted from the lighting device 100 is incident.

Particularly, the incident distance calculation unit 241 may calculate the incident distance by means of any of the three methods below.

The method of calculating the incident distance includes a method of calculating the incident distance by using transmitted power of the lighting device 100 and received power of the terminal 200, a method of calculating the incident distance by using time information about the lighting device 100 and time information about the terminal 200, and a method of calculating the incident distance by using a time difference in transmission and reception of a message.

First, the incident distance calculation unit 241 may calculate a power difference value between transmitted power and received power by comparing the transmitted power of the lighting device 100 and the received power of the terminal 200, and calculate the incident distance by using the calculated power difference value. That is, the transmitted power and the received power used in the lighting device 100 and the terminal 200 are already standardized and set, and the power is inverse proportional to a square of a distance, so that the incident distance calculation unit 241 may calculate the distance between the lighting device 100 and the terminal 200 by using the difference between the transmitted power of the lighting device 100 and the received power of the terminal 200.

Further, the incident distance calculation unit 241 may calculate a time difference value between the lighting device 100 and the terminal 200 by comparing time information measured by the lighting device 100 and time information measured by the terminal 200, and calculate the incident distance by using the calculated time difference value. That is, a speed corresponds to distance/time, so that the incident distance calculation unit 241 may calculate the distance between the lighting device 100 and the terminal 200 by using the speed value of the terminal 200 measured through the acceleration sensor and the time difference value.

In addition, the incident distance calculation unit 241 may calculate a difference value between a transmission time and a reception time by comparing a time, at which the lighting device 100 transmits the visible light signal, and a time, at which the terminal 200 receives the visible light signal, and calculate the incident distance by using the calculated time difference value.

The incident angle calculation unit 242 calculates an incident angle formed by a horizontal direction in which the terminal 200 is positioned and a direction in which the visible light signal is incident. Particularly, the incident angle calculation unit 242 calculates the incident angle by using an inclination value of the terminal 200 measured through sensors related to posture control, such as a gyro sensor.

The error distance calculation unit 243 calculates the error distance between the position of the lighting device 100 and the actual position of the terminal 200 by using the calculated incident distance and incident angle. This will be described in detail with reference to FIG. 4.

Figure 4:
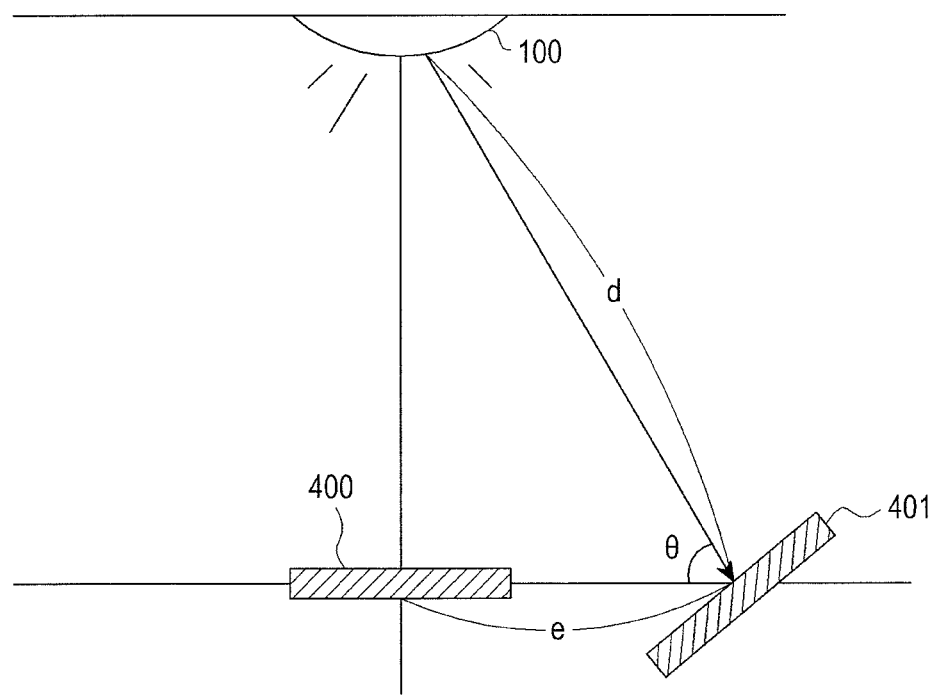
FIG. 4 is an example diagram illustrating a process of calculating an error distance according to the exemplary embodiment of the present invention.

FIG. 4 is an example diagram illustrating a process of calculating an error distance according to the exemplary embodiment of the present invention.

The lighting device 100 broadcasts a visible light signal including lighting device position information, and when a request to provide the position information about the terminal is present, the terminal may extract lighting device position information included in the visible light signal received from the lighting device 100 and provide the extracted lighting device position information as the position information about the terminal. In a case where the position of the terminal corresponds to reference numeral 400 of FIG. 4, the terminal may provide the lighting device position information as the position information about the terminal. However, in a case where the position of the terminal corresponds to reference numeral 401 of FIG. 4, an error distance is generated between the position of the terminal and the position of the lighting device.

In order to calculate the error distance, the error distance calculation unit 243 may calculate incident distance d between the lighting device 100 and the terminal positioned at a position 401 and an incident angle $\theta$ between the lighting device 100 and the terminal positioned at the position 401, and calculate an error distance e by using the calculated incident distance d and incident angle $\theta$. In this case, the error distance e is calculated through $d \times \cos \theta$.

That is, the error distance calculation unit 243 calculates a value of $d \times \cos \theta$ as the error distance e by using the incident distance d calculated through the incident distance calculation unit 241 and the incident angle $\theta$ calculated through the incident angle calculation unit 242.

The corrected position calculation unit 244 calculates the corrected position of the terminal 200 by reflecting the calculated error distance in the lighting device position information.

The memory unit 250 stores all data used in the terminal 200, and particularly, stores the lighting device position information included in the visible light signal received through the transceiver 220.

The display unit 260 displays the calculated corrected position of the terminal 200 on the screen. In this case, the display unit 260 may pre-display a pre-stored map information screen image, and display an icon indicating the calculated corrected position together with the map information screen image.

As described above, the present invention may accurately provide a position of a terminal at an indoor site by using visible light communication through a lighting device.

Figure 5:
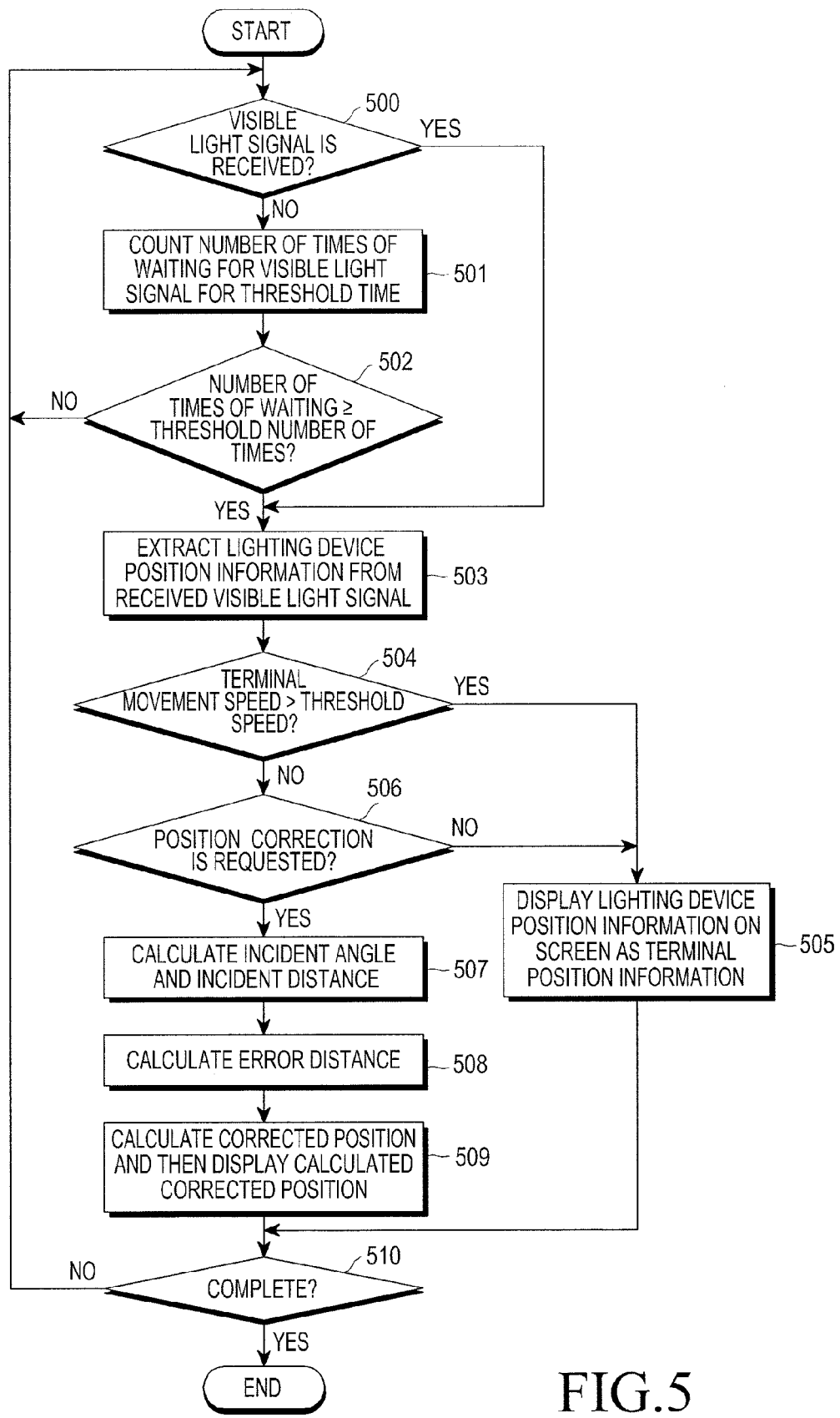
FIG. 5 is a flowchart illustrating a process of providing a corrected position of the terminal by a position correcting apparatus according to the exemplary embodiment of the present invention.

FIG. 5 is a flowchart illustrating a process of providing a corrected position of the terminal by a position correcting apparatus according to the exemplary embodiment of the present invention.

Referring to FIG. 5, when a request to provide position information about a terminal is present, the controller 210 determines whether a visible light signal is received through the transceiver 220 in step 500, and when the visible light signal is received, the process proceeds to step 503, and when the visible light signal is not received, the process proceeds to step 501.

In step 501, the controller 210 counts the number of times of waiting for a visible light signal for a predetermined threshold time. Here, the threshold time means a time predetermined for counting the number of times of waiting for reception of the visible light signal.

The controller 210 determines whether the counted number of times of waiting is equal to or greater than the threshold number of times in step 502, and when the counted number of times of waiting is equal to or greater than the threshold number of times, the process proceeds to step 503, and when the counted number of times of waiting is smaller than the threshold number of times, the process proceeds to step 500 and the controller 210 continuously determines whether the visible light signal is received. Here, the threshold number of times means the number of times predetermined for determining the reception of the visible light signal according to the counted number of times of waiting.

When the visible light signal including the lighting position information about the lighting device 100 is received, the controller 210 extracts lighting position information from the received visible light signal in step 503.

The controller 210 measures a movement speed of the terminal through the sensor unit 230 and determines whether the measured movement speed is equal to or greater than a predetermined threshold speed in step 504, and when the measured movement speed is equal to or greater than the predetermined threshold speed, the process proceeds to step 505, and when the measured movement speed is smaller than the predetermined threshold speed, the process proceeds to step 506. Here, the threshold speed means a speed value predetermined for determining whether to perform position correction of the terminal 200 according to the movement speed of the terminal 200.

The controller 210 displays the lighting device position information as the position information about the terminal 200 through the display unit 260 in step 505.

The controller 210 determines whether a position correction request of the terminal 200 is present in step 506, and when the position correction request is present, the process proceeds to step 507, and when the position correction request is not present, the process proceeds to step 505 and the controller 210 displays the lighting device position information as the position information about the terminal 200 through the display unit 260. In a case of the position correction request, the position correction may be performed when an input according to the position correction request is made from a user, but the position correction may also be performed according to an inclination of the terminal 200.

For example, when the inclination of the terminal 200 is equal to or greater than a predetermined threshold inclination through the sensor unit 230, the controller 210 determines that the position correction is required, and performs the position correction on the terminal 200.

The controller 210 calculates an incident distance through the incident distance calculation unit 241 of the position correction unit 240, and calculates an incident angle through the incident angle calculation unit 242 in step 507.

The controller 210 calculates an error distance of the terminal 200 through the error distance calculation unit 243 by using the calculated incident distance and incident angle in step 508.

In step 509, the controller 210 calculates the corrected position of the terminal 200 by using the lighting device position information and the calculated error distance through the corrected position calculation unit 244, and then displays the calculated corrected position through the display unit 260.

The controller 210 determines whether the position correction is completed in step 510, and when the position correction is completed, the controller 210 terminates a position correction operation of the terminal 200, and when the position correction is not completed, the controller 210 determines whether the visible light signal is received in step 500, and the process proceeds back to steps 501 to 510.

As described above, the present invention may accurately provide a position of a terminal at an indoor site by using visible light communication through a lighting device.

What is claimed is:

1. An electronic device for estimating a position of the electronic device by using visible light communication, comprising:
   a transceiver configured to receive a visible light signal including lighting device position information from a lighting device;
   a sensor configured to measure an acceleration of the electronic device; and
   a controller configured to:
   determine a moving speed of the electronic device based on the acceleration,
   determine whether the moving speed is smaller than a threshold speed of the electronic device, and
   determine, if the moving speed is smaller than the threshold speed, a position of the electronic device based on a position corresponding to the lighting device position information and a distance between the electronic device and the lighting device,
   wherein the distance is determined using the lighting device position information, an incident distance of the visible light signal, or an incident angle of the visible light signal.

2. The electronic device of claim 1, wherein the sensor is further configured to measure a direction and an inclination of the electronic device.

3. The electronic device of claim 1, wherein the controller is further configured to:
   determine, if the moving speed is equal to or larger than the threshold speed, the position corresponding to the lighting device position information as the position of the electronic device.

4. The electronic device of claim 2, wherein, if the inclination of the electronic device is equal to or larger than a predetermined threshold angle, the controller is further configured to determine the position of the electronic device.

5. The electronic device of claim 1, wherein the controller includes:
   an incident distance calculation unit configured to calculate the incident distance between the lighting device and the electronic device, corresponding to a direction in which the visible light signal is incident;
   an incident angle calculation unit configured to determine the incident angle between a horizontal direction in which the electronic device is oriented and the direction in which the visible light signal is incident;
   an error distance calculation unit configured to determine the distance between the electronic device and the lighting device based on the incident distance and the incident angle; and
   a corrected position calculation unit configured to determine the first position of the electronic device based on the distance.

6. A method for estimating a position of an electronic device by using visible light communication in the electronic device, the method comprising:
   receiving a visible light signal including lighting device position information from a lighting device;
   measuring an acceleration of the electronic device and determining a moving speed of the electronic device based on the acceleration;
   determining whether the moving speed is smaller than a threshold speed of the electronic device; and
   determining, if the moving speed is smaller than the threshold speed, a position of the electronic device based on a position corresponding to the lighting device position information and a distance between the electronic device and the lighting device,
   wherein the distance is determined using the lighting device position information, an incident distance of the visible light signal, or an incident angle of the visible light signal.

7. The method of claim 6, further comprising:
   measuring one of a direction and an inclination of the electronic device.

8. The method of claim 7, further comprising:
   determining, if the moving speed is larger than the threshold speed, the position corresponding to the lighting device position information as the position of the electronic device.

9. The method of claim 7, further comprising:
  determining, if the inclination of the electronic device is equal to or larger than a predetermined threshold angle, the position of the electronic device.

10. The method of claim 6, wherein the determining of the position of the electronic device includes:
  determining the incident distance between the lighting device and the electronic device corresponding to a direction in which the visible light signal is incident;
  determining the incident angle between a horizontal direction in which the electronic device is oriented and the direction in which the visible light signal is incident;
  calculating the distance between the electronic device and the lighting device based on the incident distance and the incident angle; and
  determining the position of the electronic device based on the distance.

\* \* \* \* \*